United States Patent
Tsaur et al.

(10) Patent No.: US 9,627,885 B2
(45) Date of Patent: Apr. 18, 2017

(54) ELECTROSTATIC DISCHARGE PROTECTION CIRCUIT

(71) Applicant: Realtek Semiconductor Corp., HsinChu (TW)

(72) Inventors: Tay-Her Tsaur, Tai-Nan (TW); Cheng-Cheng Yen, Hsinchu (TW)

(73) Assignee: Realtek Semiconductor Corp., HsinChu, Taiwan (TW)

( * ) Notice: Subject to any disclaimer, the term of this patent is extended or adjusted under 35 U.S.C. 154(b) by 171 days.

(21) Appl. No.: 14/592,850

(22) Filed: Jan. 8, 2015

(65) Prior Publication Data

US 2016/0056625 A1 Feb. 25, 2016

(30) Foreign Application Priority Data

Aug. 20, 2014 (TW) .............................. 103128707 A

(51) Int. Cl.
*H02H 9/00* (2006.01)
*H02H 9/04* (2006.01)

(52) U.S. Cl.
CPC .................................. *H02H 9/045* (2013.01)

(58) Field of Classification Search
CPC ............................... H02H 9/045; H02H 3/006
See application file for complete search history.

(56) References Cited

U.S. PATENT DOCUMENTS 7,660,086 B2 * 2/2010 Rodgers ................ H02H 3/006
361/111

* cited by examiner

*Primary Examiner* — Thienvu Tran
*Assistant Examiner* — Tien Mai
(74) *Attorney, Agent, or Firm* — Winston Hsu; Scott Margo

(57) ABSTRACT

An ESD protection circuit includes a plurality of resistors, at least a capacitor, a driving circuit and an ESD clamping device, wherein a first node of each resistor is connected to a first supply voltage, and a second node of each of at least a portion of the resistors is selectively connected to an input node via a corresponding switch respectively, and a first node of the capacitor is connected to a second supply voltage, and a second node of the capacitor is connected to the input node; the driving circuit is arranged to generate a driving signal according to a voltage on the input node; and the ESD clamping device is coupled to the driving circuit, and connected between the first supply voltage and the second supple voltage, and the ESD clamping device is arranged to selectively bypass an ESD current according to the driving signal.

13 Claims, 5 Drawing Sheets

ELECTROSTATIC DISCHARGE PROTECTION CIRCUIT

BACKGROUND OF THE INVENTION

1. Field of the Invention

The present invention relates to an electrostatic discharge protection circuit, and more particularly, to an electrostatic discharge protection circuit with adjustable time constant.

2. Description of the Prior Art

In recent years, because the request of law of electrostatic discharge (ESD) of electronic product are gradually increasing, except the ESD test on component level, the ESD gun test, the electrical fast transient (EFT) test, and the surge test on system level are also added into the product verification item gradually. However, the ESD stress duration of each kind of ESD test is different, for example, the ESD stress duration of the ESD gun test and the surge test on system level both are longer than that of the ESD test on component level. Therefore, how to design the ESD protection circuit in response to different tests and different products to make the ESD protection circuit can drain out the ESD current effectively in different situations to achieve the effect of protecting internal circuit is an important issue.

SUMMARY OF THE INVENTION

One of the objectives of the present invention is to provide an ESD protection circuit, which can adjust a time constant of resistor and capacitor (RC time constant) of the ESD protection circuit in response to different tests or different products to drain out the ESD current effectively in different situations to achieve the effect of protecting internal circuit.

According to an embodiment of the present invention, an ESD protection circuit comprises a plurality of resistors, at least a capacitor, a driving circuit and an ESD clamping device, wherein a first node of each resistor is connected to a first supply voltage, and a second node of each of at least a portion of the resistors is selectively connected to an input node via a corresponding switch respectively, and a first node of the capacitor is connected to a second supply voltage, and a second node of the capacitor is connected to the input node; the driving circuit is arranged to generate a driving signal according to a voltage of the input node; and the ESD clamping device is coupled to the driving circuit, and connected between the first supply voltage and the second supple voltage, and the ESD clamping device is arranged to selectively bypass an ESD current according to the driving signal.

According to another embodiment of the present invention, an ESD protection circuit comprises at least a resistor, a plurality of capacitors, a driving circuit and an ESD clamping device, wherein a first node of the resistor is connected to a first supply voltage, and a second node of the resistor is connected to an input node; a first node of each capacitor is connected a second supply voltage, and a second node of each of at least a portion of capacitors is selectively connected to the input node via a corresponding switch respectively; the driving circuit is arranged to generate a driving signal according to a voltage of the input node; and the ESD clamping device is coupled to the driving circuit, and connected between the first supply voltage and the second supply voltage, and the ESD clamping device is arranged to selectively bypass an ESD current according to the driving signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should not be interpreted as a close-ended term such as "consist of". Also, the term "couple" is intended to mean either an indirect or direct electrical connection. Accordingly, if one device is coupled to another device, that connection may be through a direct electrical connection, or through an indirect electrical connection via other devices and connections.

Figure 1:
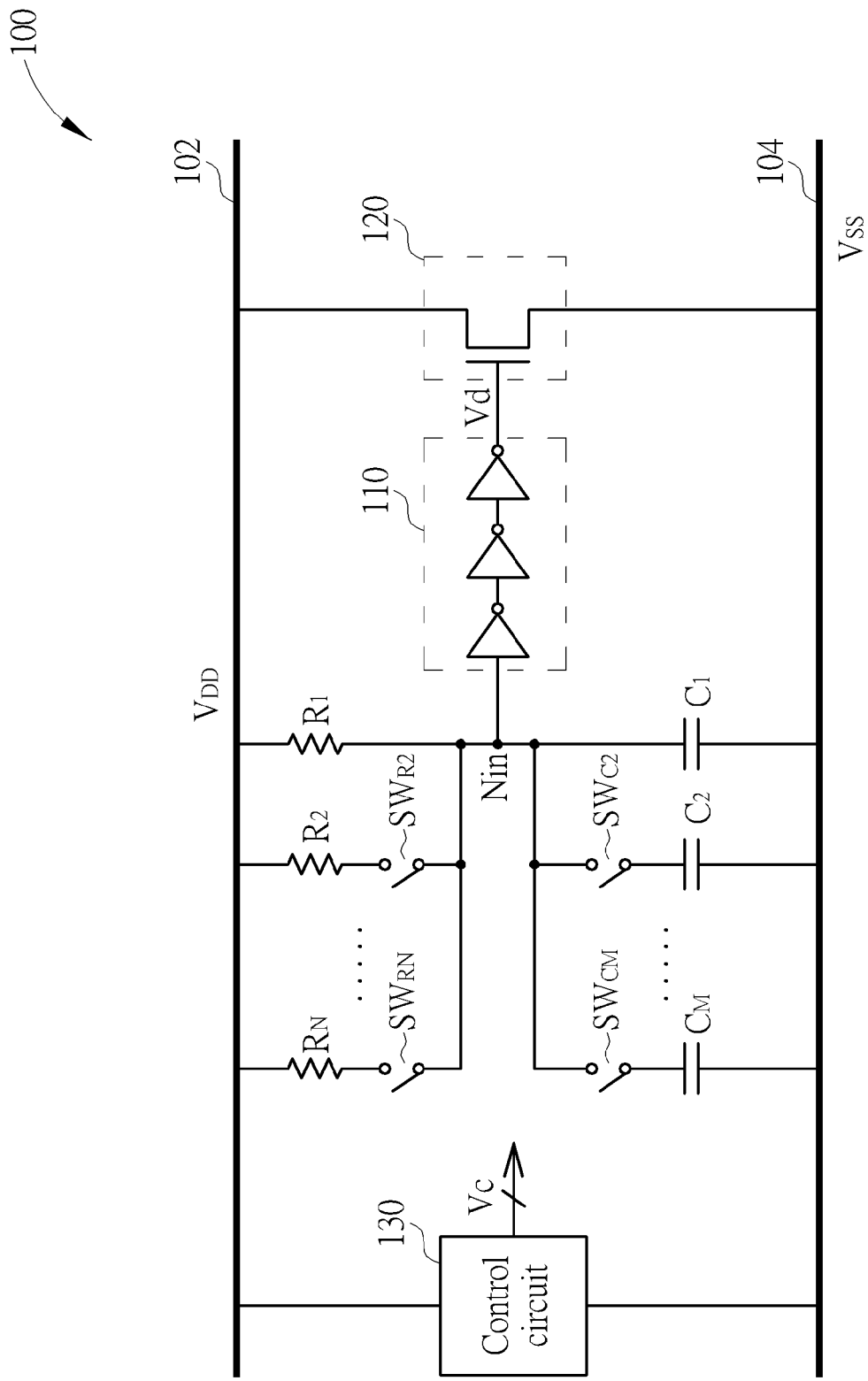
FIG. 1 is a diagram illustrating an ESD protection circuit according to an embodiment of the present invention.

Refer to FIG. 1, which is a diagram illustrating an ESD protection circuit 100 according to an embodiment of the present invention. As shown in FIG. 1, the ESD protection circuit 100 comprises a plurality of resistors $R_1$ to $R_N$, a plurality of capacitors $C_1$ to $C_M$, a driving circuit 110, an ESD clamping device 120 and a control circuit 130, wherein a first node of each of the resistors $R_1$ to $R_N$ is connected to a first power line 102 for providing a first supply voltage $V_{DD}$, a second node of the resistor $R_1$ is connected to an input node $N_{in}$, and second nodes of the resistors $R_2$ to $R_N$ are selectively connected to the input node $N_{in}$ via corresponding switches $SW_{R2}$ to $SW_{RN}$, respectively; and a first node of each of the capacitors $C_1$ to $C_M$ is connected to a second power line 104 for providing a second supply voltage $V_{SS}$, a second node of the capacitor $C_1$ is connected to the input node $N_{in}$, and second nodes of the capacitors $C_2$ to $C_M$ are selectively connected to the input node $N_{in}$ via corresponding switch $SW_{C2}$ to $SW_{CM}$, respectively.

In this embodiment, the switches $SW_{R2}$ to $SW_{RN}$ and $SW_{C2}$ to $SW_{CM}$ are programmable switches, and the conductive/nonconductive status of the switches $SW_{R2}$ to $SW_{RN}$ and $SW_{C2}$ to $SW_{CM}$ are controlled by control signals $V_C$ generated by the control circuit 130. In addition, in response to the product the ESD protection circuit 100 is applied to or the ESD test the ESD protection circuit 100 needs to perform, each of the switches $SW_{R2}$ to $SW_{RN}$ and $SW_{C2}$ to $SW_{CM}$ has a default conductive/nonconductive status respectively.

In the ESD protection circuit 100 in FIG. 1, the resistors $R_1$ to $R_N$ and the capacitors $C_1$ to $C_M$ can generate different time constants based on the conductive/nonconductive statuses of the switches $SW_{R2}$ to $SW_{RN}$ and $SW_{C2}$ to $SW_{CM}$, that is the response ability of the input node $N_{in}$ in FIG. 1 in response to the variable first supply voltage $V_{DD}$ is different. In addition, the driving circuit 110 is arranged to generate a driving signal $V_D$ according to a voltage on the input node $N_{in}$, and the ESD clamping device 120 is arranged to selectively bypass an ESD current according to the driving signal $V_D$, that is providing a current path between the first supply voltage $V_{DD}$ and the second supply voltage $V_{SS}$. In particular, although the driving circuit 110 in FIG. 1 is implemented by three series inverters, and the ESD clamping device 120 is an N-type transistor, however, the skilled person in the art should understand the driving 110 can be implemented by any other buffer circuit, and the ESD clamping device 120 can also have different architecture.

Figure 2:
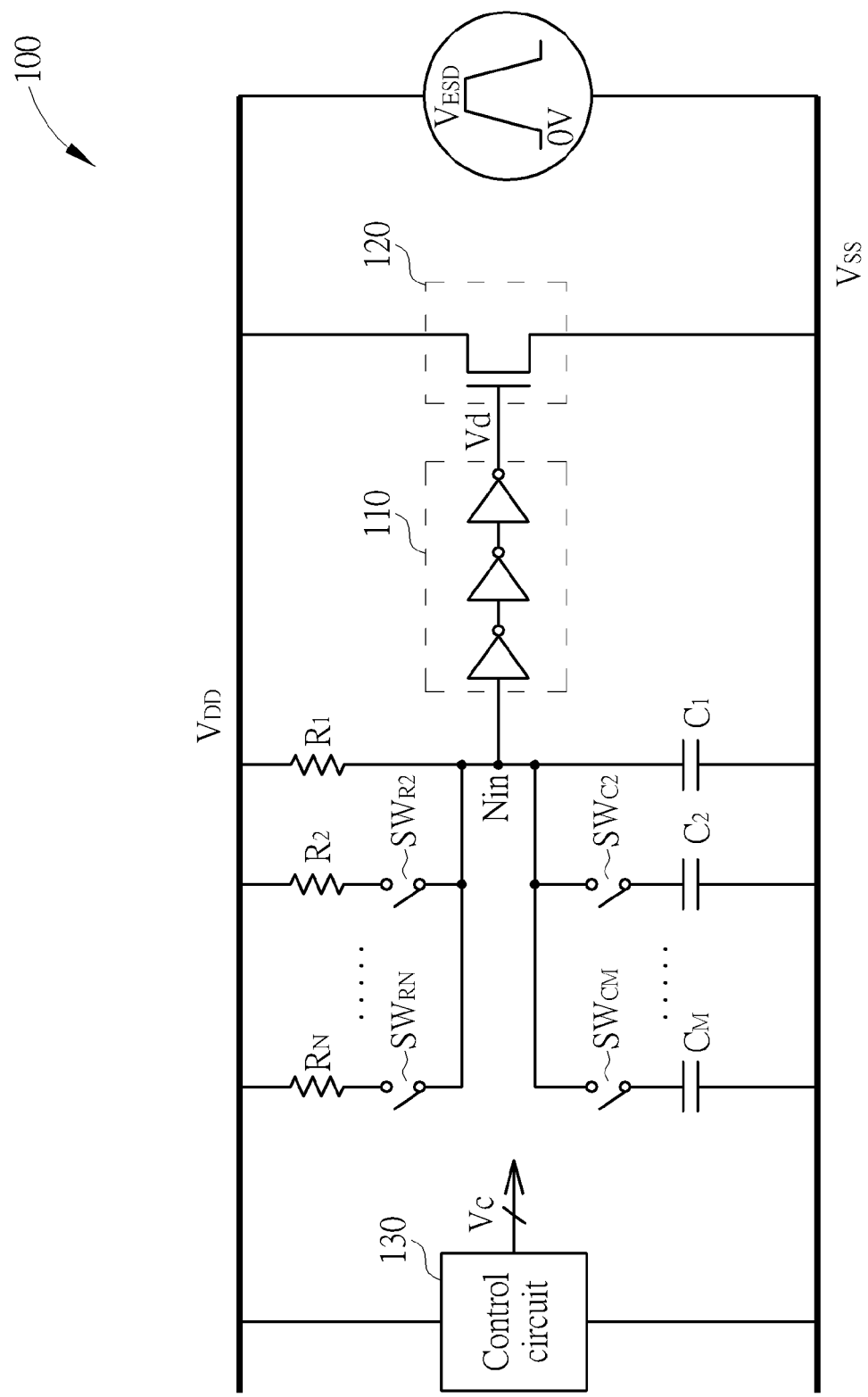
FIG. 2 is a diagram illustrating when an ESD protection circuit performs the Human-Body Model (HBM) test on component level.

The following is an example for explaining the diagram illustrating the ESD protection circuit 100 performs the time constant setting according to the ESD test needed to be performed. Refer to FIG. 2 first, a testing pulse with a voltage level $V_{ESD}$ is added on the first power line 102 when the ESD protection circuit 100 needs to perform the Human-Body Model (HBM) test on component level, in this time, the control circuit 130 is set to generate the control signal $V_C$ to make all the switches $SW_{R2}$ to $SW_{RN}$ and $SW_{C2}$ to $SW_{CM}$ nonconductive, that is the time constant generated by the circuit in FIG. 2 is in this time. In an embodiment, because the time constant relates to the voltage climbing time of the input node $N_{in}$, the bigger the time constant is, the longer the voltage climbing time of the input node $N_{in}$ will be. Therefore, the time constant is longer than the width of the pulse of the testing pulse when the ESD protection circuit 100 performs the HBM test (this width of the pulse can be referred to an associated specification) to keep the ESD clamping device 120 conductive to bypass an ESD current generated by the testing pulse in the period of the testing pulse having the high voltage level $V_{ESD}$.

Figure 3:
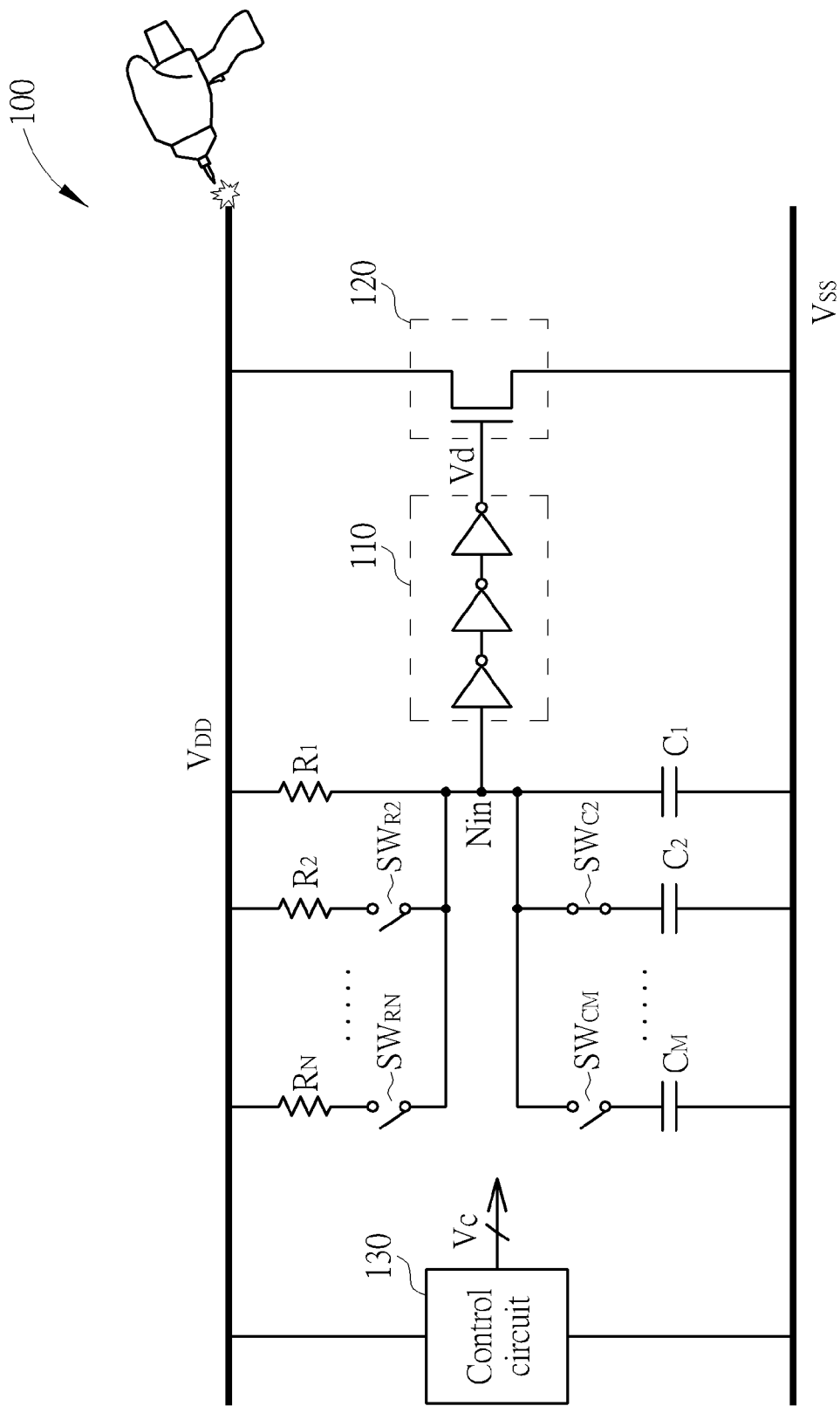
FIG. 3 is a diagram illustrating when an ESD protection circuit performs the ESD gun test on system level.

Next, refer to FIG. 3, the control circuit 130 is set to generate the control signal $V_C$ to make the switch $SW_{C2}$ conductive and the rest of switches are all nonconductive when the ESD protection circuit 100 needs to perform the ESD gun test on system level, that is the time constant generated by the resistors $R_1$ to $R_N$ and the capacitors $C_1$ to $C_M$ is $R_1*(C_1+C_2)$ in this time. In an embodiment, the time constant $R_1*(C_1+C_2)$ is bigger than a width of a pulse of a test pulse generated by the ESD gun when the ESD protection circuit 100 performs the ESD gun test on system level (the width of pulse can be referred to the associated specification) to keep the ESD clamping device 120 conductive to bypass an ESD current generated by the testing pulse in the period of the testing pulse having the high voltage level.

According to the abovementioned statements about FIG. 2 and FIG. 3, when the ESD protection circuit 100 needs to perform other kind of ESD tests, for example, the EFT test or the surge test, it can also decide the most suitable time constant by controlling the conductive/nonconductive statuses of each of the switches $SW_{R2}$ to $SW_{RN}$ and $SW_{C2}$ to $SW_{CM}$ to achieve the best ESD protective effect.

In particular, the abovementioned FIG. 1 to FIG. 3 states that according to the different electronic product the ESD protection circuit 100 is applied in or the ESD test the ESD protection circuit 100 needs to perform to generate a circuit of resistors and capacitors with different time constant. Therefore, the skilled person in the art should understand the designs of the resistors $R_1$ to $R_N$ and the capacitors $C_1$ to $C_M$ in FIG. 1 to FIG. 3 are not a limitation of the present invention. For example, in other embodiments of the present invention, each of the resistor $R_1$ and the capacitor $C_1$ can connect to the input node $N_{in}$ via a switch, and the positions that the resistors $R_1$ to $R_N$ and the capacitors $C_1$ to $C_M$ are disposed in can be switched (other circuits need to change correspondingly), or the resistor $R_2$ to $R_N$ and the switches $SW_{R2}$ to $SW_{RN}$ can be removed from the ESD protection circuit 100 in FIG. 1 (i.e. the controllable range of the time constant is $(R_1*C_1)$ to $(R_1*(C_1+C_2+\ldots+C_M)$), or the capacitors $C_2$ to $C_M$ and the switches $SW_{C2}$ to $SW_{CM}$ can be removed from the ESD protection circuit 100 in FIG. 1 (i.e. the controllable range of the time constant is $(R_1*C_1)$ to $((R_1//R_2\ldots//R_N)*C_1)$), these alternative designs should fall within the scope of this invention.

Figure 4:
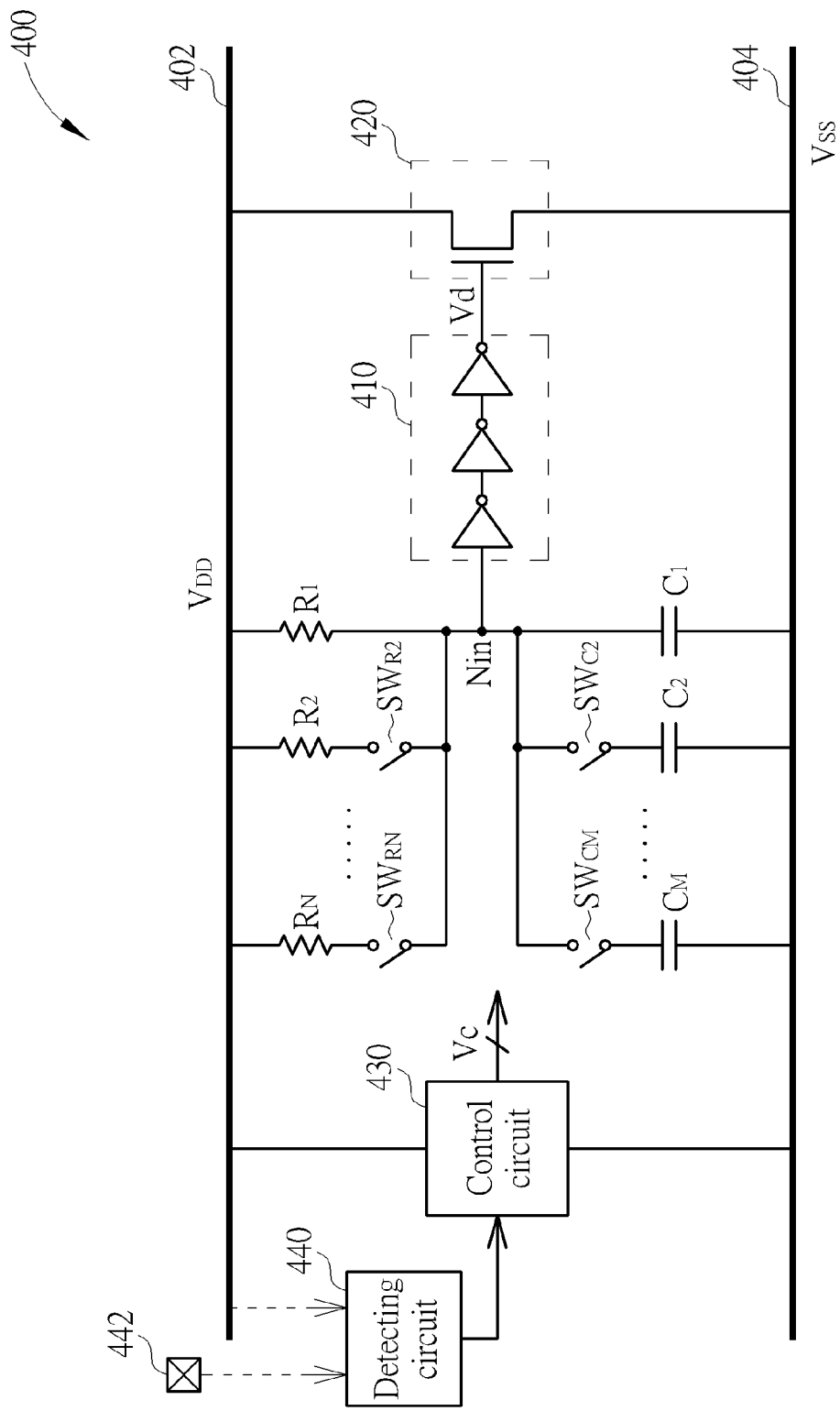
FIG. 4 is a diagram illustrating an ESD protection circuit according to another embodiment of the present invention.

Refer to FIG. 4, which is a diagram illustrating an ESD protection circuit 400 according to another embodiment of the present invention. As shown in FIG. 4, the ESD protection circuit 400 comprises a plurality of resistors $R_1$ to $R_N$, a plurality of capacitors $C_1$ to $C_M$, a driving circuit 410, an ESD clamping device 420, a control circuit 430 and a detecting circuit 440, wherein a first node of each of the resistors $R_1$ to $R_N$ is connected to a first power line 402 for providing a first supply voltage $V_{DD}$, a second node of the resistor $R_1$ is connected to the input node $N_{in}$, and second nodes of the resistors $R_2$ to $R_N$ are selectively connected to the input node $N_{in}$ via corresponding switches $SW_{R2}$ to $SW_{RN}$, respectively; and a first node of each of the capacitors $C_1$ to $C_M$ is connected to a second power line 404 for providing a second supply voltage $V_{SS}$, a second node of the capacitor $C_1$ is connected to the input node $N_{in}$, and second nodes of the capacitors $C_2$ to $C_M$ are selectively connected to the input node $N_{in}$ via corresponding switches $SW_{C2}$ to $SW_{CM}$, respectively.

In this embodiment, the switches $SW_{R2}$ to $SW_{RN}$ and $SW_{C2}$ to $SW_{CM}$ are programmable switches, and the conductive/nonconductive statuses of the switches $SW_{R2}$ to $SW_{RN}$ and $SW_{C2}$ to $SW_{CM}$ are controlled by control signals $V_C$ generated by the control circuit 430. In addition, in response to the product the ESD protection circuit 400 is applied in or the ESD test the ESD protection circuit 400 needs to perform, each of switches $SW_{R2}$ to $SW_{RN}$ and $SW_{C2}$ to $SW_{CM}$ has a default conductive/nonconductive status respectively.

In the ESD protection circuit 400 in FIG. 4, the resistors $R_1$ to $R_N$ and the capacitors $C_1$ to $C_M$ can generate different time constant based on the conductive/nonconductive statuses of the switches $SW_{R2}$ to $SW_{RN}$ and $SW_{C2}$ to $SW_{CM}$, that is the response ability of the input node $N_{in}$ in FIG. 4 in response to the variable first supply voltage $V_{DD}$ is different. In addition, the driving circuit 410 is arranged to generate a driving signal $V_D$ according to a voltage of the input node $N_{in}$, and the ESD clamping device 420 is arranged to selectively bypass an ESD current according to the driving signal $V_D$, that is providing a current path between the first supply voltage $V_{DD}$ and the second supply voltage $V_{SS}$. In particular, although the driving circuit 410 in FIG. 4 is implemented by three series inverters, and the ESD clamping device 420 is an N type transistor, however, the skilled person in the art should understand the driving 410 can be implemented by any other buffer circuit, and the ESD clamping device 420 can also have different architecture.

In addition, in the ESD protection circuit 400 in FIG. 4, the detecting circuit 440 detects a voltage level of a node 442 or a voltage level of the first power line 402 to generate a detecting result, wherein the node 442 can be any node that can reflect if electrostatic event occurs in chip, for example, any node connected to the first supply voltage $V_{DD}$; and the control circuit 430 can control each of the switches $SW_{R2}$ to $SW_{RN}$ and $SW_{C2}$ to $SW_{CM}$ dynamically according to the detecting result generated by the detecting circuit 440 to generate a circuit of resistor and capacitor with different time constant. For example, the control circuit 430 generates the control signal $V_C$ to generate the circuit of resistors and capacitors with bigger time constant when the detecting circuit 440 detects the voltage lever of the first power line 402 is higher than a threshold value, which means makes the time constant that the resistor $R_1$ to $R_N$ and the capacitor $C_1$ to $C_M$ reflect on the input node $N_{in}$ bigger than the time constant on the input node $N_{in}$ when the switches $SW_{R2}$ to $SW_{RN}$ and $SW_{C2}$ to $SW_{CM}$ have the default conductive/nonconductive statuses. For example, assuming that the default statuses of all of the switches $SW_{R2}$ to $SW_{RN}$ and $SW_{C2}$ to $SW_{CM}$ are nonconductive, that is, the RC time constant that the circuit reflects on the input node $N_{in}$ is $R_1*C_1$, the control circuit 430 can generate a control signal $V_C$ to make the switch $SW_{C2}$ be conductive when the detecting circuit 440 detects that the voltage level of the first power line 402 is higher than a threshold value, which means the RC time constant reflects on the input node $N_{in}$ becomes $R_1*(C_1+C_2)$. Next, the control circuit 430 can generates the control signal $V_C$ again to make the switch $SW_{C2}$ be nonconductive when the detecting circuit 440 detects the voltage level of the first power line 402 is decreasing, for example, lower than a threshold value, which means that the RC time constant reflects on the input node $N_{in}$ resumes to the default $R_1*C_1$.

Figure 5:
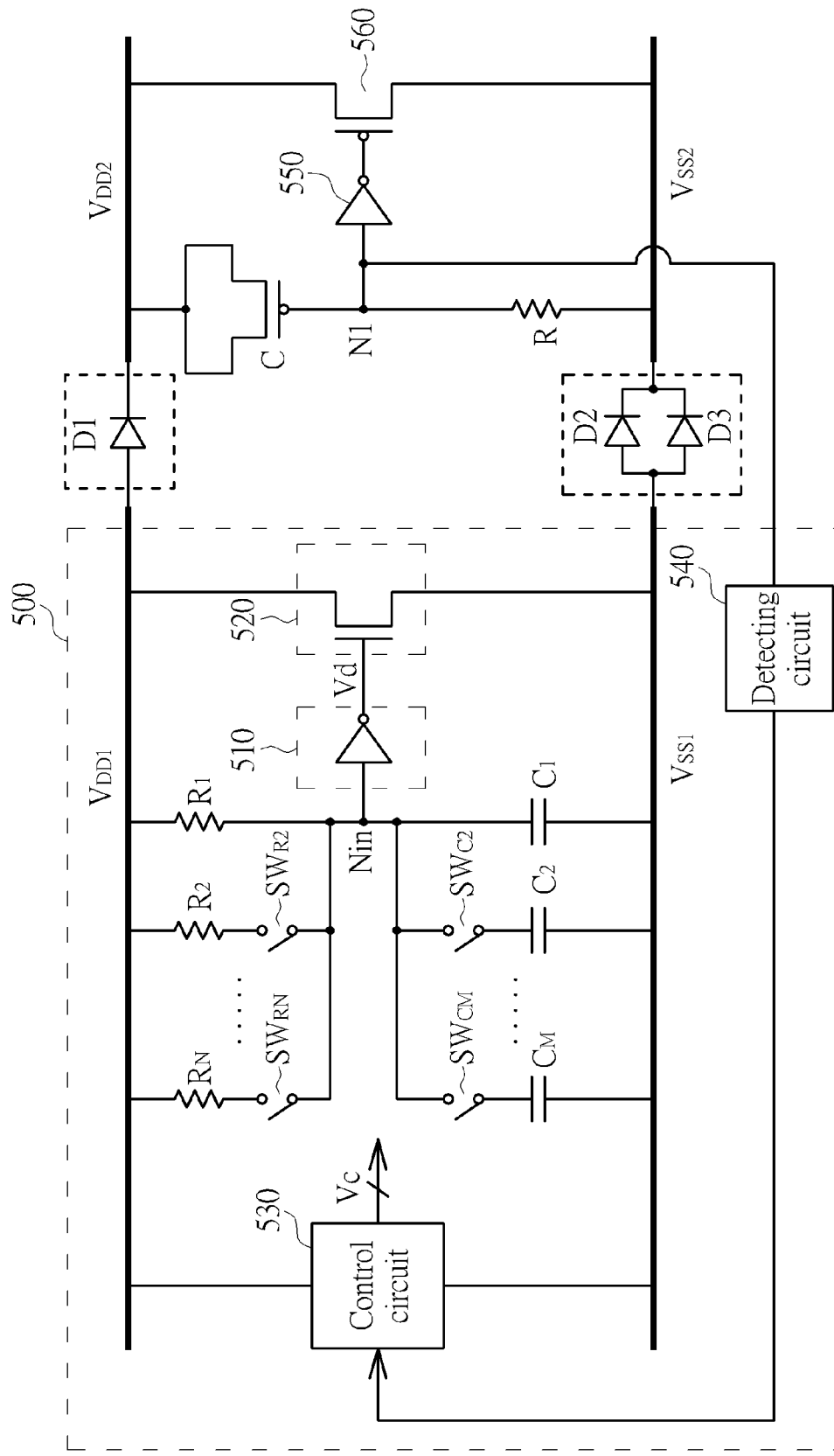
FIG. 5 is a diagram illustrating an ESD protection circuit according to another embodiment of the present invention.

Refer to FIG. 5, which is a diagram illustrating an ESD protection circuit 500 according to another embodiment of the present invention. As shown in FIG. 5, the ESD protection circuit 500 comprises a plurality of resistors $R_1$ to $R_N$, a plurality of capacitor $C_1$ to $C_M$, a driving circuit 510, an ESD clamping device 520, a control circuit 530 and a detecting circuit 540, wherein a first node of each of the resistors $R_1$ to $R_N$ is connected to a first supply voltage $V_{DD1}$ of a first power domain, a second node of the resistor $R_1$ is connected to an input node $N_{in}$, and second nodes of the resistors $R_2$ to $R_N$ are selectively connected to the input node $N_{in}$ via corresponding switches $SW_{R2}$ to $SW_{RN}$, respectively; and a first node of each of the capacitors $C_1$ to $C_M$ is connected to a second supply voltage $V_{SS1}$ of the first power domain, a second node of the capacitor $C_1$ is connected to the input node $N_{in}$, and second nodes of the capacitors $C_2$ to $C_M$ are selectively connected to the input node $N_{in}$ via corresponding switches $SW_{C2}$ to $SW_{CM}$, respectively.

In addition, the ESD protection circuit 500 is disposed in a chip, and the chip further comprises a circuit in a second power domain, wherein the circuit uses the second power domain in FIG. 5 is also an ESD protection circuit, and the circuit comprises a resistor R, a capacitor C, a driving circuit 550 and an ESD clamping device 560. In FIG. 5, the supply voltages $V_{DD1}$, $V_{DD2}$, $V_{SS}$, and $V_{SS2}$ of the first power domain and the second power domain are connected via diodes D1, D2 and D3, respectively.

In this embodiment, the switches $SW_{R2}$ to $SW_{RN}$ and $SW_{C2}$ to $SW_{CM}$ are programmable switches, and the conductive/nonconductive status of the switches $SW_{R2}$ to $SW_{RN}$ and $SW_{C2}$ to $SW_{CM}$ are controlled by control signals $V_C$ generated by the control circuit 530. In addition, in response to the product the ESD protection circuit 500 is applied in or the ESD test the ESD protection circuit 500 needs to perform, each of the switches $SW_{R2}$ to $SW_{RN}$ and $SW_{C2}$ to $SW_{CM}$ has a default conductive/nonconductive status respectively.

In the ESD protection circuit 500 in FIG. 5, the resistors $R_1$ to $R_N$ and the capacitors $C_1$ to $C_M$ can generate different time constant based on the conductive/nonconductive statuses of the switches $SW_{R2}$ to $SW_{RN}$ and $SW_{C2}$ to $SW_{CM}$, that is the response ability of the input node $N_{in}$ in FIG. 5 in response to the variable first supply voltage $V_{DD}$ is different. In addition, the driving circuit 510 is arranged to generate a driving signal $V_D$ according to a voltage of the input node $N_{in}$, and the ESD clamping device 520 is arranged to selectively bypass an ESD current according to the driving signal $V_D$, that is providing a current path between the first supply voltage $V_{DD1}$ and the second supply voltage $V_{SS1}$. In particular, although the driving circuit 510 in FIG. 5 is implemented by three series inverters, and the ESD clamping device 520 is an N-type transistor, however, the skilled person in the art should understand the driving 510 can be implemented by any other buffer circuit, and the ESD clamping device 520 can also have different architecture.

In addition, in the ESD protection circuit 500 in FIG. 5, the detecting circuit 540 detects a node N1 in the second power domain to generate a detecting result, and the control circuit 530 can control each of the switches $SW_{R2}$ to $SW_{RN}$ and $SW_{C2}$ to $SW_{CM}$ dynamically according to the detecting result generated by the detecting circuit 540 to generate a circuit of resistors and capacitors with different time constant. For example, the control circuit 530 generates control signals $V_C$ to generate a circuit of resistors and capacitors with bigger time constant when the detecting circuit 540 detects that a voltage level of the node N1 is higher than a threshold value, that is to make the RC time constant reflected on the input node $N_{in}$ is bigger than the time constant on the input node $N_{in}$ when the switches $SW_{R2}$ to $SW_{RN}$ and $SW_{C2}$ to $SW_{CM}$ have the default conductive/nonconductive statuses. Next, the control circuit 530 can generate the control signal $V_C$ again to make the switch $SW_{C2}$ be nonconductive when the detecting circuit 540 detects that the voltage level of the node N1 is decreasing, for example, lower than a threshold value, which means the resistors $R_1$ to $R_N$ and the capacitors $C_1$ to $C_M$ resume the default time constant, In particular, although the detecting circuit 540 in FIG. 5 detects the node N1 in the second power domain to generate the detecting result, however, in other embodiments of the present invention, the detecting circuit 540 can also detect any other node in the chip which can reflect if electrostatic event occurs to generate detecting result, these alternative designs should fall within the scope of this invention.

In the ESD protection circuit 500 in FIG. 5, the circuit in the first power domain can be the important circuit in the chip, therefore, increasing the time constant of the circuit of resistors and capacitors actively by detecting if there is any electrostatic event occurs in other power domains can protect the internal circuit in advance.

Briefly summarized, in the ESD protection circuit of the present invention, the RC time constant of the ESD protection circuit can be adjusted in response to different ESD tests or different products the ESD protection circuit is applied to, therefore, the ESD current can be effectively drained out in different situation to achieve the effect of protecting internal circuit.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. An electrostatic discharge (ESD) protection circuit, comprising:
 a plurality of resistors, wherein a first node of each resistor is connected to a first supply voltage, and a second node of each of at least a portion of the resistors is selectively connected to an input node via a corresponding switch;

at least a capacitor, wherein a first node of the capacitor is connected to a second supply voltage, and a second node of the capacitor is connected to the input node;

a driving circuit, connected to the input node, arranged to generate a driving signal according to a voltage of the input node; and an ESD clamping device, coupled to the driving circuit and connected between the first supply voltage and the second supply voltage, wherein the ESD clamping device is arranged to selectively bypass an ESD current according to the driving signal;

wherein the ESD protection circuit is disposed in a chip, and the ESD protection circuit further comprises:

a detecting circuit, arranged to monitor a voltage level of a specific node in the chip to generate a detecting result; and a control circuit, coupled to the detecting circuit, arranged to dynamically control the conductive/nonconductive statuses of the switches corresponding to the at least a portion of the resistors according to the detecting result directly.

2. The ESD protection circuit of claim 1, wherein the switches corresponding to the at least a portion of the resistors respectively are programmable switches, and each of the switches has a default conductive/nonconductive status.

3. The ESD protection circuit of claim 1, wherein the first supply voltage is provided by a first power line, the second supply voltage is provided by a second power line, and the detecting circuit monitors a voltage level of the first power line or a voltage level of the second power line to generate the detecting result.

4. The ESD protection circuit of claim 1, wherein the control circuit controls the conductive/nonconductive statuses of the switches corresponding to the at least a portion of the resistors to have a first configuration when the detecting result shows that the voltage level of the specific node is higher than a predetermined voltage level, and the control circuit controls the conductive/nonconductive statuses of the switches corresponding to the at least a portion of the resistors to have a second configuration when the detecting result shows that the voltage level of the specific node is lower than a predetermined voltage level, wherein the a time constant reflected on the input node corresponding to the first configuration is greater than a time constant reflected on the input node corresponding to the second configuration.

5. The ESD protection circuit of claim 1, wherein the specific node and the ESD protection circuit are disposed in different power domains of the chip, respectively.

6. The ESD protection circuit of claim 1, wherein the at least a capacitor comprises a plurality of capacitors, a first node of each capacitor is connected to the second supply voltage, and a second node of at least a portion of the capacitors is selectively connected to the input node via a corresponding switch.

7. The ESD protection circuit of claim 6, wherein the switches corresponding to the at least a portion of the resistors and the at least a portion of the capacitors are programmable switches, and the switches have default conductive/nonconductive statuses, respectively.

8. The ESD protection circuit of claim 7, wherein the control circuit is arranged to control the conductive/nonconductive statuses of the switches corresponding to the at least a portion of the resistors and the at least a portion of the capacitors.

9. The ESD protection circuit of claim 8, wherein the first supply voltage is provided by a first power line, and the second supply voltage is provided by a second power line, and the detecting circuit monitors a voltage level of the first power line or a second power line to generate the detecting result.

10. The ESD protection circuit of claim 8, wherein the control circuit controls the conductive/nonconductive statuses of the switches corresponding to the at least a portion of the resistors and the at least a portion of the capacitors to have a first configuration when the detecting result shows that the voltage level of the specific node is higher than a predetermined voltage level, and the control circuit controls the conductive/nonconductive statuses of the switches corresponding to the at least a portion of the resistors and the at least a portion of the capacitors to have a second configuration when the detecting result shows that the voltage level of the specific node is lower than a predetermined voltage level, wherein the a time constant reflected on the input node corresponding to the first configuration is greater than a time constant reflected on the input node corresponding to the second configuration.

11. The ESD protection circuit of claim 8, wherein the specific node and the ESD protection circuit are disposed in different power domains of the chip, respectively.

12. An ESD protection circuit, comprising:

at least a resistor, wherein a first node of the resistor is connected to a first supply voltage, and a second node is connected to an input node;

a plurality of capacitors, wherein a first node of each capacitor is connected to a second supply voltage, and a second node of at least a portion of the capacitors is selectively connected to the input node via a corresponding switch respectively;

a driving circuit, connected to the input node, arranged to generate a driving signal according to a voltage of the input node; and an ESD clamping device, coupled to the driving circuit and connected between the first supply voltage and the second supply voltage, wherein the ESD clamping device is arranged to selectively bypass an ESD current according to the driving signal;

wherein the ESD protection circuit is disposed in a chip, and the ESD protection circuit further comprises:

a detecting circuit, arranged to monitor a voltage level of a specific node in the chip to generate a detecting result and a control circuit, coupled to the detecting circuit, arranged to dynamically control the conductive/nonconductive statuses of the switches corresponding to the at least a portion of the capacitors according to the detecting result directly.

13. The ESD protection circuit of claim 12, wherein the switches corresponding to the at least a portion of the capacitors respectively are programmable switches, and the switches have default conductive/nonconductive statuses, respectively.

* * * * *